United States Patent Office 3,133,894
Patented May 19, 1964

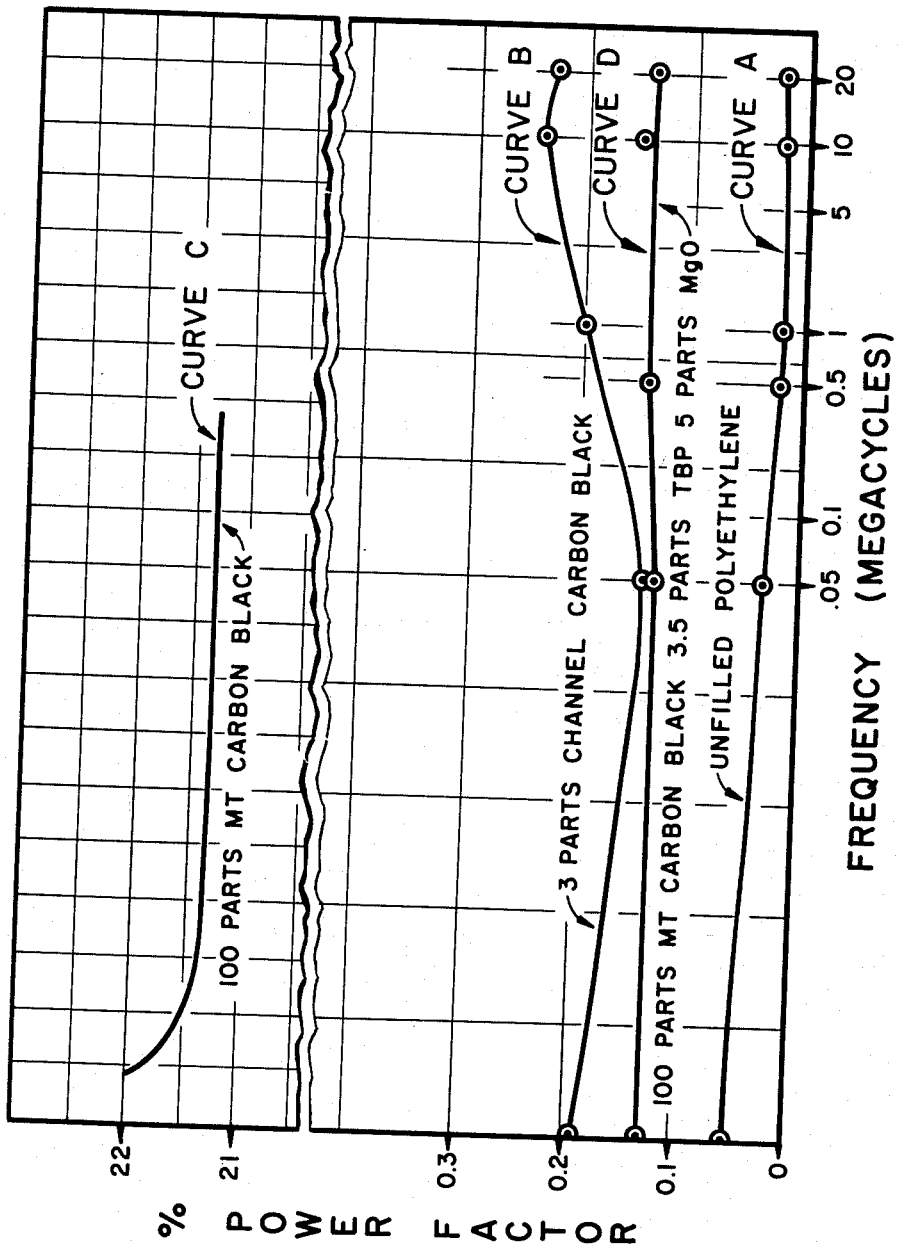

3,133,894
POLYETHYLENE RESIN INSULATING MATERIAL
Bram B. S. T. Boonstra, Sharon, Mass., assignor to Cabot Corporation, Boston, Mass., a corporation of Delaware
Filed Feb. 6, 1958, Ser. No. 713,590
7 Claims. (Cl. 260—41)

This invention relates generally to synthetic organic plastic compositions and more particularly to compositions of polymers and copolymers formed of a substantially saturated resin derived from olefinic monomers containing relatively large amounts of carbon black, which have superior electrical and physical properties.

Resins of the above type, such as polyethylene, have been suitable for use as insulating material in many electrical applications because of their ease of handling, high softening point, low moisture absorption, and excellent electrical properties. The dielectric constant of polyethylene, for example, is only about 2.3, its power factor at all frequencies is only 0.03 percent, and its dielectric strength is high. However, it has certain disadvantages which make it unsuitable for use in many applications. It is inflammable, it softens rapidly at temperatures over 90° C., and it is extremely susceptible to degradation by sunlight and corona.

Although the resistance of polyethylene to ultraviolet radiation can be increased by the addition of a small percentage of carbon black, the resulting composition has electrical qualities somewhat inferior to those of unfilled polyethylene, with no compensating improvement in any other properties. For example, the addition of 3 parts of channel black to 100 parts of polyethylene increases its resistance to ultraviolet radiation; however, it also increases the power factor and provides no appreciable increase in strength or softening temperature.

The principal object of this invention is to provide a resinous composition having particular utility as an insulating material for electrical conductors.

A particular object of the invention is to provide a composition comprising polyethylene with a relatively high loading of carbon black which has improved physical and electrical properties.

A further object of the invention is to provide an electrical insulating material comprising polyethylene with relatively large amounts of carbon black filler which has an exceptionally low power factor.

Other objects of the invention will be obvious to one skilled in the art from the following description of a specific embodiment thereof.

In accordance with this invention, I have discovered that a polymeric composition containing between 25 and 150 parts of carbon black filler per 100 parts of resin may be treated to produce a compound which is superior to polyethylene compounds heretofore known as an insulating material for many applications, particularly in having a higher softening point, greater resistance to ultraviolet radiation, and a power factor sufficiently low to permit it to be used in high-frequency electrical apparatus.

Specifically, I have found that a resinous material of the above-identified type compounded with carbon black in an amount of between 0.25 and 1.5 parts of carbon black per part by weight of resin, which has an extremely high power factor due to the presence of the carbon black, may be modified to provide a superior insulating material by incorporating therein a minor amount of a cross-linking agent comprising an organic compound having a perbenzoxy group, and a minor proportion of a metal oxide which is capable of reacting with benzoic acid, followed by a suitable heat treatment to effect cross linking of the polyethylene.

In a particular embodiment of this invention, 100 parts by weight of polyethylene, 100 parts by weight of carbon black (medium thermal), 3.5 parts by weight of tertiary butyl perbenzoate and 5 parts by weight of MgO were milled in a Banbury mixer at 180 to 230° F. The resulting compound was formed into test sheets 0.08" thick, and cured in a press for 10 minutes at 350° F. The cured compound was tough, flexible, and strong, having a yield strength of 2300 p.s.i. at 25° C. compared to 1700 p.s.i. for unfilled polyethylene, and a yield strength of 600 p.s.i. at 100° C., compared to zero strength for unfilled polyethylene.

The power factor of a dielectric material is an indication of the energy loss occurring therein when it is subjected to an alternating electric field. In an ideal dielectric, with a sine-wave charging current, the vectors of voltage and current are 90° apart. The loss in the dielectric is expressed by the equation $W=EI \cos \theta$, where $W$ is the energy loss in watts, $E$ is the voltage, $I$ the total current, and $\theta$ is the phase angle between the total current and voltage. Hence, for the ideal dielectric, the energy loss is zero, since $\theta=90°$ and cosine $\theta$ is zero. If energy loss occurs in the dielectric, the phase angle between the voltage and total current is less than 90°, and the power factor, cosine $\theta$, will increase as the power loss increases. In measuring the power factor of a dielectric, since cosine $\theta$ is usually small, it is customary to express this value as percent power factor, which is cosine $\theta$ multiplied by 100.

In the accompanying drawing, which is a series of curves in which power factor is plotted as a function of frequency, the power factor of compounds of this invention are compared with the power factors of various other materials, as follows:

Curve A—unfilled polyethylene.
Curve B—polyethylene compounded with 3 parts of channel black per 100 parts of resin.
CURVE C—polyethylene compounded with 100 parts by weight of carbon black (medium thermal per 100 parts of resin.
CURVE D—the compound of curve C containing in addition 3.5 parts of tertiary butyl perbenzoate and 5 parts MGO, which has been cured for 10 minutes at 350° F.

A comparison of curve C with curve D shows the remarkable decrease in power factor obtained by the practice of this invention.

Although the power factor of the material produced in accordance with this invention is higher than that of unfilled commercial grade polyethylene (compare curve D with curve A) it is nevertheless in the same range as that of polyethylene containing a small percentage of carbon black for ultraviolet resistance (curve B) and is sufficiently low to permit its use as an insulator for conductors in many types of service, e.g. drop wire and in high frequency applications.

The material produced in accordance with this invention also has physical properties far superior to that of previously known polyethylene compounds. In addition to the superior yield strength mentioned hereinbefore, I have found that an electrical apparatus insulated with the compositions disclosed herein may be subjected to temperatures as high as 120° C. without appreciable softening of the insulation, and may be subjected to temperatures as high as 200° C. without the insulating material losing its shape, provided it is in an unstressed condition. Even at higher temperatures the insulating material does not melt and drop off of the conductor, but chars without passing through a liquid phase.

Although the compounds disclosed herein are flammable, they ignite much less readily than pure polyethylene, burn more slowly, and do not drip while burning.

Although in the above example the cross-linking agent used was tertiary butyl perbenzoate, other organic compounds containing the perbenzoxy group may be used, provided they are sufficiently non-volatile and have a decomposition temperature high enough to permit them to be milled into the polyethylene-carbon black mixture without cross linking occurring during the milling process.

The tertiary butyl perbenzoate used in the above example has the following structural formula:

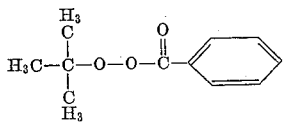

Other compounds which may be used successfully and which are commercially available are para-methane perbenzoate:

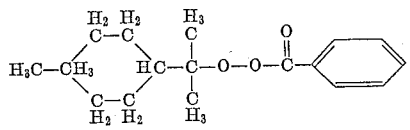

and cumyl perbenzoate:

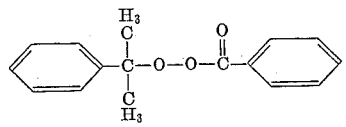

In general compounds of the following structure may be used

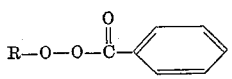

where R is an alkyl, aryl, or cyclo-alkyl radical, or combinations thereof, with compounds having the following structures being preferred

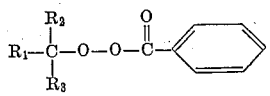

where any R is an alkyl, aryl, or cyclo-alkyl radical, or combinations thereof, provided, of course, that the compounds have the physical characteristic mentioned hereinbefore.

The amount of cross-linking agent necessary may range slightly depending on its volatility and the temperature at which the individual type of polyethylene must be milled, and lies within the range of 1.5 to 10 parts per 100 parts of resin. It is only necessary that sufficient cross-linking agent be included to insure that a substantial amount of cross linking occurs in subsequent heat treatment.

The metal oxide used must be one which is capable of reactions with the benzoic acid formed during the heat treatment process. Preferred is MgO but other suitable compounds include ZnO, CaO, Al$_2$O$_3$, BaO, and SrO.

The amount of the oxide used depends somewhat on the amount of cross-linking agent used, but generally it is preferred to utilize at least one part by weight per 100 parts of resin. Larger amounts provide some additional improvement in the power factor, but no substantial improvement occurs above about 10 parts.

Although 100 parts of carbon black per 100 parts of resin were used in the above example, amounts of carbon black up to about 175 parts have been used without any substantial increase in the power factor. Of course, less than 100 parts of carbon black may be used if desired, for example, as little as 25 parts.

Since certain other obvious changes may be made without departing from the scope of the invention, it is intended that all matter contained herein be interpreted in an illustrative and not in a limiting sense.

Having thus described my invention, I claim:

1. A plastic molding compound which can be converted by heat into products having a surprising combination of physical strength, heat stability and electrical properties comprising polyethylene resin, carbon black in amounts between about 0.25 and 1.5 parts per part by weight of said resin, a cross-linking agent containing a perbenzoxy group and which is sufficiently non-volatile and has a decomposition temperature sufficiently high to permit it to be milled into said resin, and at least one part per 100 parts by weight of said resin of a metal oxide chosen from the group consisting of MgO, ZnO, CaO, Al$_2$O$_3$, BaO, and SrO.

2. A molding compound as set forth in claim 1 in which the cross-linking agent comprises

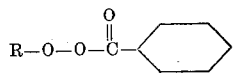

where R is an alkyl, cyclo-alkyl, or aryl radical, or combinations thereof.

3. A molding compound as set forth in claim 1 in which the metal oxide is magnesium oxide.

4. A molding compound as set forth in claim 1 in which the cross-linking agent comprises

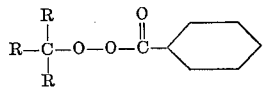

where any R is an alkyl, cyclo-alkyl, or aryl radical, or combinations thereof.

5. A plastic molding compound as set forth in claim 1 in which the cross-linking agent is tertiary butyl perbenzoate and the metal oxide is magnesium oxide.

6. An electrical structure comprising a conductor and a polymeric insulating material disposed thereon, said insulating material comprising chemically crosslinked polyethylene resin, carbon black uniformly dispersed throughout said resin in amounts between about 0.25 and 1.5 parts per part by weight of said resin, and the reaction products which are retained when said resin is crosslinked by means of the heat decomposition of a crosslinking agent comprising

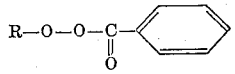

where R is an alkyl, cyclo-alkyl or aryl radical, or combination thereof in the presence of at least one part per 100 parts by weight of said resin of a metal oxide chosen from the group consisting of MgO, ZnO, CaO, Al$_2$O$_3$, BaO and SrO, said crosslinking agent and said metal oxide having been previously incorporated throughout said resin.

7. The electrical structure of claim 6 in which the metal oxide is MgO.

References Cited in the file of this patent

UNITED STATES PATENTS

| | | |
|---|---|---|
| 2,628,214 | Pinkney et al. | Feb. 10, 1953 |
| 2,737,502 | Land et al. | Mar. 6, 1956 |
| 2,874,140 | Kloepfer | Feb. 17, 1959 |
| 2,958,672 | Goldberg | Nov. 1, 1960 |

FOREIGN PATENTS

| | | |
|---|---|---|
| 532,665 | Great Britain | Jan. 29, 1941 |
| 591,058 | Great Britain | Aug. 6, 1947 |